United States Patent

Barrer et al.

[15] 3,663,164
[45] May 16, 1972

[54] CRYSTALLINE ZEOLITE AND METHOD OF PREPARATION

[72] Inventors: Richard M. Barrer, Bromley, England; John F. Cole, Amsterdam, Netherlands; Hans Sticher, Zug, Switzerland

[73] Assignee: Air Products and Chemicals, Inc., Wayne, Pa.

[22] Filed: Oct. 8, 1969

[21] Appl. No.: 864,908

[30] Foreign Application Priority Data

Oct. 11, 1968 Great Britain ............... 48,309/68

[52] U.S. Cl. ........................... 23/112, 23/113, 252/455 Z
[51] Int. Cl. ........................... C01b 33/28
[58] Field of Search ............ 23/112, 113, 111; 252/455 Z

[56] References Cited

UNITED STATES PATENTS

| 2,991,151 | 7/1961 | Breck et al. ............... 23/113 |
| 2,992,068 | 7/1961 | Haden et al. .............. 23/112 |
| 3,009,776 | 11/1961 | Sensel ..................... 23/112 |
| 3,010,789 | 11/1961 | Milton ..................... 23/113 |
| 3,037,843 | 6/1962 | Mason ...................... 23/112 |
| 3,123,441 | 3/1964 | Haden et al. .............. 23/113 |
| 3,431,218 | 3/1969 | Plank et al. .............. 252/455 |

FOREIGN PATENTS OR APPLICATIONS

| 635,566 | 1/1962 | Canada ..................... 23/113 |

OTHER PUBLICATIONS

Barrer et al., " J. Chem. Soc." 1951 pp. 1,267– 1,278.
Barrer et al., " J. Chem. Soc." 1953 pp. 4,029– 4,035.

*Primary Examiner*—Edward J. Meros
*Attorney*—B. Max Klevit and John R. Ewbank

[57] ABSTRACT

Crystalline zeolites are prepared by reacting raw kaolinite with aqueous alkali metal hydroxide solutions at temperatures between 80° to 140° C.

2 Claims, No Drawings

CRYSTALLINE ZEOLITE AND METHOD OF PREPARATION

GENERAL BACKGROUND

This invention relates to zeolites, crystalline aluminosilicates useful as selective sorbents, molecular sieves, ion exchangers and catalysts.

The literature discloses that many methods have been employed to make zeolites. When the starting material is kaolinite, the preparation involved calcining or otherwise dehydrating the kaolinite to convert it to the amorphous metakaolinite which was then converted to crystalline zeolite in the presence of aqueous alkali metal hydroxides.

It is the primary object of this invention to provide a method of making zeolites more economically wherein zeolitization is effected with the use of raw kaolinite at relatively low temperatures.

Another object of the invention is to provide novel species of zeolites.

Other objects of the invention will become apparent from the description thereof which follows:

The instant method of synthesizing the zeolites was carried out by placing weighed amounts of raw kaolinite and metered volumes of alkali metal hydroxides of predetermined concentrations in screw-top polypropylene bottles or sealed glass tubes which were rotated end-over-end in thermostatically controlled air ovens. Larger-scale preparations below about 100° C. were made with stirring in larger glass reaction vessels under nitrogen fitted with condensers and temperature controllers. The crystalline products were separated on No. 4 porosity sintered-glass filters, washed and dried and finally stored at about 20° C. over a saturated solution of $Ca(NO_3)_2$ (56 percent hum.).

Pure hydroxides of the alkali metals were used in the reaction mixtures; those of Rb and Cs having been prepared by reacting their sulfates with barium hydroxide.

One Kaolinite employed had an analysis of $SiO_2$=45.10%; $Al_2O_3$=38.57%; $Fe_2O_3$=0.46%; $TiO_2$=1.75%; CaO=0 MgO=0.03%; $K_2O$=0.08%; $Na_2O$=0.18% and loss on ignition = 13.67%. Kaolinites generally similar in composition but differing to a minor extent in percentages of components also can be used.

While the term kaolinite is sometimes employed as the description of a specific crystalline clay form having the oxide type formulation $Al_2O_3 \cdot 2SiO_2 \cdot 2H_2O$, it is here employed in its broader sense as the mineral characteristics of kaolinite. Acceptable kaolinite clays may range in composition in the order of 44.0–47.0% $SiO_2$, 36.5–39.4% $Al_2O_3$, 12.0–15.0% loss on ignition; along with minor amounts of impurities such as 0.2–2.0% $Fe_2O_3$, 0.1–2.0% $TiO_2$, and up to several percent of the alkaline earth and alkali metal oxides in varying proportions.

Table 1 which follows lists some of the zeolites formed by the foregoing method and the conditions under which the reactions were carried out:

TABLE 1

| Ex. | Product Designation | Reaction Mixture | Temp. (°C.) | Time |
|---|---|---|---|---|
| 1 | Li–A | 2g. kaolinite+ 10g. $LiOH \cdot H_2O$+ 30ml. $H_2O$ | 140 | 30 hr. |
| 2 | Li–K | as in Example 1 | 140 | 12 hr. |
| 3 | Li–K | as in Example 1 | 120 | 15 hr. |
| 4 | Li–K | as in Example 1 | 95 | 15 hr. |
| 5 | Li–K | 0.5g. kaolinite+ 10ml. 4.25M LiOH | 80 | 64 days |
| 6 | Rb–D | 1.5 g. kaolinite+ 25ml. 1.5M RbOH | 80 | 10 days |
| 7 | Rb–D | as in Example 1 | 80 | 20 days |
| 8 | Cs–D | 0.5g. kaolinite+ 10ml. 3M CsOH | 120 | 6 days |
| 9 | Cs–D | as in Example 1 | 80 | 14 days |
| 10 | Cs–D | as in Example 1 | 80 | 6 days |
| 11 | Cs–D | as in Example 1 | 80 | 18 days |

Potassium compounds of considerable diversity were also obtained at low temperatures by the action of aqueous KOH on raw kaloinite, the products crystallizing from reaction mixtures generally at 80° C. At constant temperature the products depend primarily upon the hydroxide concentration, the density of the kaolinite suspension playing only a minor role.

A zeolite, herein designated K–I ($K_2O$, $Al_2O_3$, $2SiO_2$, $4H_2O$) crystallized as very samll hexagonal plates from 1.8 to 4.0 molal aqueous KOH solutions below 100° C. The hexagonal unit cell had parameters a=13.51±0.04 A and c=13.50±0.3 A. An examination of K–I in a heating X-ray diffractometer showed it to decompose at 168°±5° C., before loss of all zeolite water.

Another zeolite, herein designated K–G, a near chabazite, crystallized from the reaction mixture as small spherulites at 80° C. when the KOH concentration was less than 1.8 molal and the reaction mixture was not agitated.

Another zeolite, designated K–F ($K_2O$, $Al_2O_3$, $2SiO_2$, $3H_2O$) appeared as lath-like clusters when raw kaolinite was reacted with fairly concentrated KOH in the temperature range of 80°–120 C. For example the zeolite crystallized from reaction mixtures containing 0.46, 0.44, 0.47 and 0.47 gms. of kaolinite per 100 ml. $H_2O$ and 8.7, 11.5, 4.0 and 6.2 molal KOH which were maintained at temperatures of 80° C., 80° C., 120° C. and 120° C. for 9, 13, 7 and 7 days respectively, and which times the products were removed from the reation tubes.

Yet another zeolite, herein designated K–Z ($K_2O$, $Al_2O_3$, $2SiO_2$, KOH $3.5H_2O$) appeared as well-formed lath-like crystals obtained only by reacting raw kaolinite with saturated KOH and no excess of water. For example, the zeolite was formed when 0.57 gms. of kaolinite per 10 ml. $H_2O$ was reacted with saturated KOH (about 32 molal) at 80° C. the product was removed from the reaction tube. It is stable on heating to 400° C. The zeolite water, lost in a continuous manner on the thermogravimetric balance by heating to 300° C., was regained by storing the sample over saturated aqueous $Ca(NO_3)_2$. This feature is of value in that the use of such product as a drying agent exhibits stability through the sorption-desorption cycle. The product is a "basic" zeolite with KOH present, apparently as the intercalated species. It exhibits a strong endotherm at 490° C. accompanied by an increase in the differential weight loss.

Similarly reacting raw kaolinite with aqueous NaOH in the manner set forth in Table 1 will also produce zeolitic products.

A comparison of the X-ray powder patterns of some of the zeolites made by the instant method appears in the following Table II:

TABLE II.—COMPARISON OF d-SPACINGS

| K–F | | Rb–D Prepn. (1) | | Rb–D Prepn. (2) | | Cs–D | | K–Z | | Li–A | | Li–K | |
|---|---|---|---|---|---|---|---|---|---|---|---|---|---|
| (¹) | I | (¹) | I | (¹) | (²) | (¹) | I | (¹) | I | (¹) | I | (¹) | I |
| | | 7.04 | m | 7.05 | 36 | 7.16 | w | 5.33 | m | 6.45 | vs | 4.40 | ¹35 |
| 6.93 | m | 6.61 | w | 6.55 | 10 | | | 4.56 | w | 5.20 | s | 2.66 | 100 |
| 6.53 | m | | | 5.65 | 10 | | | 4.22 | w | 4.26 | vs | 2.42 | 30 |
| | | | | 5.15 | 9 | 5.07 | w | 4.16 | w | 4.08 | w | 2.335 | 25 |
| 4.77 | w | 4.81 | vw | 4.95 | 13 | 4.87 | w | 3.93 | w | 3.27 | w | 1.790 | 20 |
| 4.45 | w | | | 4.80 | 12 | | | 3.65 | m | 3.17 | vs | 7.536 | 30 |
| 4.15 | w | 4.22 | vw | | | | | 3.54 | m | 3.02 | vs | 1.296 | ¹19 |
| 3.98 | w | | | | | 4.00 | w | 3.26 | m | 2.68 | vw | | |
| | | | | | | | | 3.08 | w | 2.625 | w | | |
| 3.45 | m | 3.51 | m | 3.50 | 54 | 3.56 | m | 3.03 | w | 2.498 | vs | | |
| 3.26 | vw | | | 3.28 | 7 | | | 2.92 | s | 2.455 | m | | |
| 3.09 | m | 3.09 | s | 3.09 | 100 | 3.14 | s | 2.89 | w | 2.380 | w | | |

TABLE II.—COMPARISON OF d-SPACINGS —Continued

| K–F | | Rb–D Prepn. (1) | | Rb–D Prepn. (2) | | Cs–D | | K %[1] | | Li–A[1] | | Li–K[1] | |
|---|---|---|---|---|---|---|---|---|---|---|---|---|---|
| 3.06 | vs | | | 3.03 | 11 | 3.01 | s | 2.87 | w | 2.325 | s | | |
| 2.94 | vs | 2.98 | vs | 2.96 | 100 | | | 2.70 | w | 2.240 | w | | |
| 2.79 | vs | 2.83 | s | 2.825 | 79 | 2.86 | s | 2.56 | vw | 2.170 | m | | |
| | | | | 2.740 | 9.5 | | | 2.53 | vw | 2.040 | w | | |
| 2.66 | w | | | 2.680 | 6.5 | | | 2.46 | w | 1.960 | mw | | |
| 2.55 | vw | | | | | | | 2.34 | w | 1.865 | w | | |
| 2.42 | vw | | | 2.400 | 4 | | | | | 1.835 | w | | |
| 2.36 | w | | | | | | | | | 1.750 | m | | |
| (¹) | I | (¹) | I | (¹) | (²) | (¹) | I | (¹) | I | (¹) | I | (¹) | I |
| 2.30 | w | 2.33 | vw | | | 2.36 | vw | | | | | | |
| 2.24 | w | 2.27 | m | | | 2.29 | w | | | 1.715 | m | | |
| | | 2.20 | w | | | 2.22 | w | | | 1.625 | w | | |
| | | 2.10 | vvw | 2.110 | 4.5 | | | | | 1.580 | w | | |
| 1.83 | w | 2.01 | vvw | 2.020 | 4 | | | | | 1.550 | w | | |
| 1.77 | w | 1.859 | vw | 2.005 | 4 | | | | | 1.520 | m | | |
| 1.72 | w | | | 1.850 | 6 | | | | | 1.472 | m | | |
| | | | | 1.795 | 4 | 1.770 | w | | | 1.445 | w | | |
| | | 1.747 | w | 1.755 | 18 | | | | | 1.415 | m | | |
| | | | | | | | | | | 1.405 | m | | |
| | | | | | | | | | | 1.390 | vw | | |
| | | | | | | | | | | 1.375 | vw | | |
| | | | | | | | | | | 1.365 | vw | | |
| | | | | | | | | | | 1.345 | w | | |
| | | | | | | | | | | 1.330 | m | | |
| | | | | | | | | | | 1.312 | w | | |
| | | | | | | | | | | 1.265 | w | | |

¹ d(A.).
² I/I₀ (percent).
³ Difference.

It will be seen from Table II that the Rb and Cs zeolites have very similar X-ray powder patterns and that these are also similar to the pattern for K–F. Thus all three zeolites are apparently based upon the same type of aluminosilicate framework. The oxide compositions of the zeolites K–F, Rb—D and Cs—D are respectively $K_2O, Al_2O_3, 2SiO_2, 3H_2O$; $Rb_2O, Al_2O_3, 2SiO_2, 2.6H_2O$ and $Cs_2O, Al_2O_3, 2SiO_2, 2.4H_2O$. All three zeolites possess unusual thermal stability. K–F remained unchanged on heating to 1,000° C. in the thermogravimetric apparatus, and inverted to kaliphilite ($K_2O, Al_2O_3, 2SiO_2$) at 1,095° C. Cs— and Rb—D inverted to anhydrous phases with similar X-ray powder patterns at 1,060° C. and 1,085° C. respectively.

The low temperature crystalline compound of lithium, Li—K, was grown over a range of alkali concentrations between 80° and 140° C., as seen in Table I. Li—A, which replaced Li—K in a reaction of longer duration, is a zeolite of oxide composition $Li_2O, Al_2O_3, 2SiO_2, 4H_2O$. Li—K was also hydrated, and lost 10.5 percent water smoothly by heating to 500° C Hence its composition is $Li_2O \cdot Al_2O_3 \cdot 2 SiO_2 \cdot 2.3 H_2O$. Its d-spacings are given in Table II.

The crystalline zeolites Li—A, K—G, K–F, Rb—D and Cs—D and K–I, of this application were all found to be ion exchangers of high cation exchange capacity able to exchange with other alkali-metal ions, alkaline earth metal ions, ammonium, silver and other cationic species. Selectivity in exchange is of importance in collecting and so concentrating certain ions such as silver or radio-nuclides like cesium or strontium. For example, K–G is selective for $K^+$ over $Na^+$ and the preferential removal of potassium is important in the operation of kidney machines.

All the zeolites of this ivention also have a considerable affinity and sorption capacity for water, which they imbibe selectively. This makes them useful as desiccants, especially when the liquids or gases being dried comprise other molecules unable by reason of size, shape or lack of polarity to penetrate the zeolite crystals.

Further, the unusual thermal stability exhibited by zeolites K–F, Rb—D and Cs—D exceeds the environmental demands of usual operations employing and utilizing the sorbent and molecular sieve properties of crystalline zeolites. This increased thermal ceiling provides an increased factor of safety and shortened times for thermal desorption treatment.

It will be understood that skilled artisans may make minor modifications and variations without departing from the spirit of the invention and the scope of the appended claims.

We claim:

1. A crystalline basic potassium zeolite having a composition $$K_2O \cdot Al_2O_3 \cdot 2 SiO_2 \cdot KOH \cdot 3.5 H_2O,$$

the KOH and $H_2O$ being intercalated in the potassium aluminodi-silicate framework, the atoms of which composition being arranged in a unit cell in such a manner that the X-ray powder diffraction of the composition features d spacings as follows:

| d(A) | I |
|---|---|
| 5.33 | m |
| 4.56 | W |
| 4.22 | W |
| 4.16 | W |
| 3.93 | W |
| 3.65 | M |
| 3.54 | M |
| 3.26 | M |
| 3.08 | W |
| 3.03 | W |
| 2.92 | S |
| 2.89 | W |
| 2.87 | W |
| 2.70 | W |
| 2.56 | VW |
| 2.53 | VW |
| 2.46= | W |
| 2.34 | W | said composition reversibly being dehydrated and hydrated when heated to about 300° C. and subjected to a moist atmosphere at ambient temperature.

2. A method of preparing the basic potassium zeolite of claim 1 which consists essentially of the steps of preparing a reaction mixture consisting essentially of raw kaolinite and an aqueous solution about 32 molal of potassium hydroxide, heating the reaction mixture to about 80° C., maintaining the reaction mixture at about 80° C. for a time period sufficient for said zeolite to form, and separating the solid product from the reaction mixture.

* * * * *

PO-1050
(5/69)

UNITED STATES PATENT OFFICE
CERTIFICATE OF CORRECTION

Patent No. 3,663,164          Dated May 16, 1972

Inventor(s) Richard M. Barrer, John F. Cole, Hans Sticher

It is certified that error appears in the above-identified patent and that said Letters Patent are hereby corrected as shown below:

Column 1, line 37 "CaO=0" should read --CaO=10%--.

Table 2, last column "$^1$35 meaning difference" should read --$^3$35--.

Table 2, last column "$^1$19 meaning difference" should read --$^3$19--.

Signed and sealed this 9th day of January 1973.

(SEAL)
Attest:

EDWARD M. FLETCHER, JR.          ROBERT GOTTSCHALK
Attesting Officer                Commissioner of Patents